United States Patent
Rising, III et al.

(10) Patent No.: US 7,925,139 B2
(45) Date of Patent: Apr. 12, 2011

(54) DISTRIBUTED SEMANTIC DESCRIPTIONS OF AUDIOVISUAL CONTENT

(75) Inventors: Hawley K. Rising, III, San Jose, CA (US); Ali Tabatabai, Beaverton, OR (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2187 days.

(21) Appl. No.: 10/005,252

(22) Filed: Dec. 3, 2001

(65) Prior Publication Data
US 2004/0202450 A1 Oct. 14, 2004

(51) Int. Cl.
*H04N 5/93* (2006.01)

(52) U.S. Cl. .................................... 386/281; 386/285

(58) Field of Classification Search .................. 386/46, 386/52, 55, 83, 95, 111, 112, 200, 241, 278, 386/281, 285; 382/224
See application file for complete search history.

(56) References Cited

U.S. PATENT DOCUMENTS

| | | | |
|---|---|---|---|
| 5,012,334 A * | 4/1991 | Etra | 348/107 |
| 5,805,784 A * | 9/1998 | Crawford | 345/473 |
| 6,070,167 A | 5/2000 | Qian et al. | |
| 6,665,442 B2 * | 12/2003 | Sekiguchi et al. | 382/224 |
| 7,509,580 B2 * | 3/2009 | Sezan et al. | 715/719 |

FOREIGN PATENT DOCUMENTS

| | | |
|---|---|---|
| JP | 3-125356 | 5/1991 |
| JP | 7-326089 | 12/1995 |
| WO | WO 01/03002 A2 | 1/2001 |

OTHER PUBLICATIONS

Fauconnier, G., et al., "Conceptual Integration Net works," Cognitive Science, vol. 22, No. 2., 1998, pp. 133-187.
Goguen, J., "An Introduction To Algebraic Semiotics, With Application To User Interface Design,"Computation For Metaphor, Analogy and Agents, vol. 1562, 1999, pp. 242-291.
Goguen, J., "Sh eaf Semantics For Concurrent Interacting Objects," Mathematic al Structures in Computer Science, vol. 2, 1992, pp. 159-191.

* cited by examiner

*Primary Examiner* — Huy T Nguyen
(74) *Attorney, Agent, or Firm* — Blakely, Sokoloff, Taylor & Zafman LLP

(57) ABSTRACT

A method and apparatus for processing descriptions of audiovisual content are described. According to one embodiment, a description of audiovisual content is created, and information pertaining to reuse of the description of audiovisual content is defined. Further, the description of audiovisual content and the reuse information are stored in a repository of descriptive data to enable subsequent reuse of this description.

40 Claims, 9 Drawing Sheets

DISTRIBUTED SEMANTIC DESCRIPTIONS OF AUDIOVISUAL CONTENT

FIELD OF THE INVENTION

The present invention relates to multimedia data processing and more specifically to multimedia data processing based upon semantic descriptions.

BACKGROUND OF THE INVENTION

The Motion Picture Expert Group (MPEG) develops standards concerning audiovisual content. One component of the MPEG standard scheme includes MPEG-7 standards which are directed to providing descriptions of audiovisual content that may be of interest to the user. Specifically, the MPEG-7 standards are developed to standardize information describing the audiovisual content. The MPEG-7 standards may be used in various areas, including storage and retrieval of audiovisual items from databases, broadcast media selection, teleshopping, multimedia presentations, personalized news service on the Internet, etc.

According to MPEG-7 standards, descriptions of audiovisual content consist of descriptors and description schemes. Descriptors represent features of audiovisual content and define the syntax and the semantics of each feature representation. Description schemes (DS) specify the structure and semantics of the relationships between their components. These components may be both descriptors and description schemes. Conceptual aspects of a description scheme can be organized in a tree or in a graph. The graph structure is defined by a set of nodes that represent elements of a description scheme and a set of edges that specify the relationship between the nodes.

Descriptions (i.e., descriptors and DSs) of audiovisual content are divided into segment descriptions and semantic descriptions. Segment descriptions describe the audiovisual content from the viewpoint of its structure. That is, the descriptions are structured around segments which represent physical spatial, temporal or spatio-temporal components of the audiovisual content. Each segment may be described by signal-based features (color, texture, shape, motion, audio features, etc.) and some elementary semantic information.

Semantic descriptions describe the audiovisual content from the conceptual viewpoints, i.e., the semantic descriptions describe the actual meaning of the audiovisual content rather then its structure. The segment descriptions and semantic descriptions are related by a set of links, which allows the audiovisual content to be described on the basis of both content structure and semantics together. The links relate different semantic concepts to the instances within the audiovisual content described by the segment descriptions.

Current semantic descriptions are limited in their descriptive capabilities because they describe specific semantic entities without identifying the relationships between these specific semantic entities and other related semantic entities. For instance, the current model of a semantic description includes multiple DSes for various semantic entities such as, for example, an event, an object, a state, an abstract concept, etc. An event DS describes a meaningful temporal localization. For example, an event DS may be associated with a concrete instance in the real world or the media (e.g., a wedding). An object DS describes semantically a specific object (e.g., a car depicted in an image). A state DS identifies semantic properties of the entity (e.g., of an object or event) at a given time, in a given spatial location, or in a given media location. A concept DS describes abstract elements that are not created by abstraction from concrete objects and events. Concepts such as freedom or mystery are typical examples of entities described by concept descriptions.

The above DSes describe specific entities. However, a description cannot be complete if it only describes an individual entity by itself. Most human description and communication is accomplished by bringing information together, information is seldom completely delineated in any exchange. Hints are present in speech that cause both parties to construct reasonably compatible or similar mental models, and the information discussed is discussed within such context. Accordingly, a description cannot accurately and completely describe the content unless it contains various additional information related to this content. This additional information may include background information, context information, information identifying relationships between the content being described and other entities, etc.

In addition, no current mechanism exists for creating descriptions of metaphors or analogies. A traditional opinion is that semantic descriptions should only describe audiovisual material and, therefore, there is no need to create metaphorical descriptions. However, humans use metaphors and analogies all the time without realization of such use. Such metaphors and analogies as "feeling like a fish out of water," "getting close to the deadline," "flying like a bird," etc. are inherent in human communication. Thus, it would be undesirable to exclude descriptions of metaphors and analogies from a list of possible descriptions.

Further, current semantic descriptions are static. When the material described by an existing semantic description changes, the process of creating a description must be performed anew to produce a new semantic description describing the changed material.

Accordingly, a tool is required to create semantic descriptions that are capable of completely and accurately describe any semantic situation, audiovisual or otherwise. Such a tool should also be able to create descriptions that would dynamically reflect changes in the material being described.

SUMMARY OF THE INVENTION

A method and apparatus for processing descriptions of audiovisual content are described. According to one embodiment, a description of audiovisual content is created, and information pertaining to reuse of the description of audiovisual content is defined. Further, the description of audiovisual content and the corresponding reuse information are stored in a repository of descriptive data to enable subsequent reuse of this description.

BRIEF DESCRIPTION OF THE DRAWINGS

The present invention is illustrated by way of example, and not by way of limitation in the figures of the accompanying drawings in which like reference numerals refer to similar elements.

DETAILED DESCRIPTION

Figure 1:
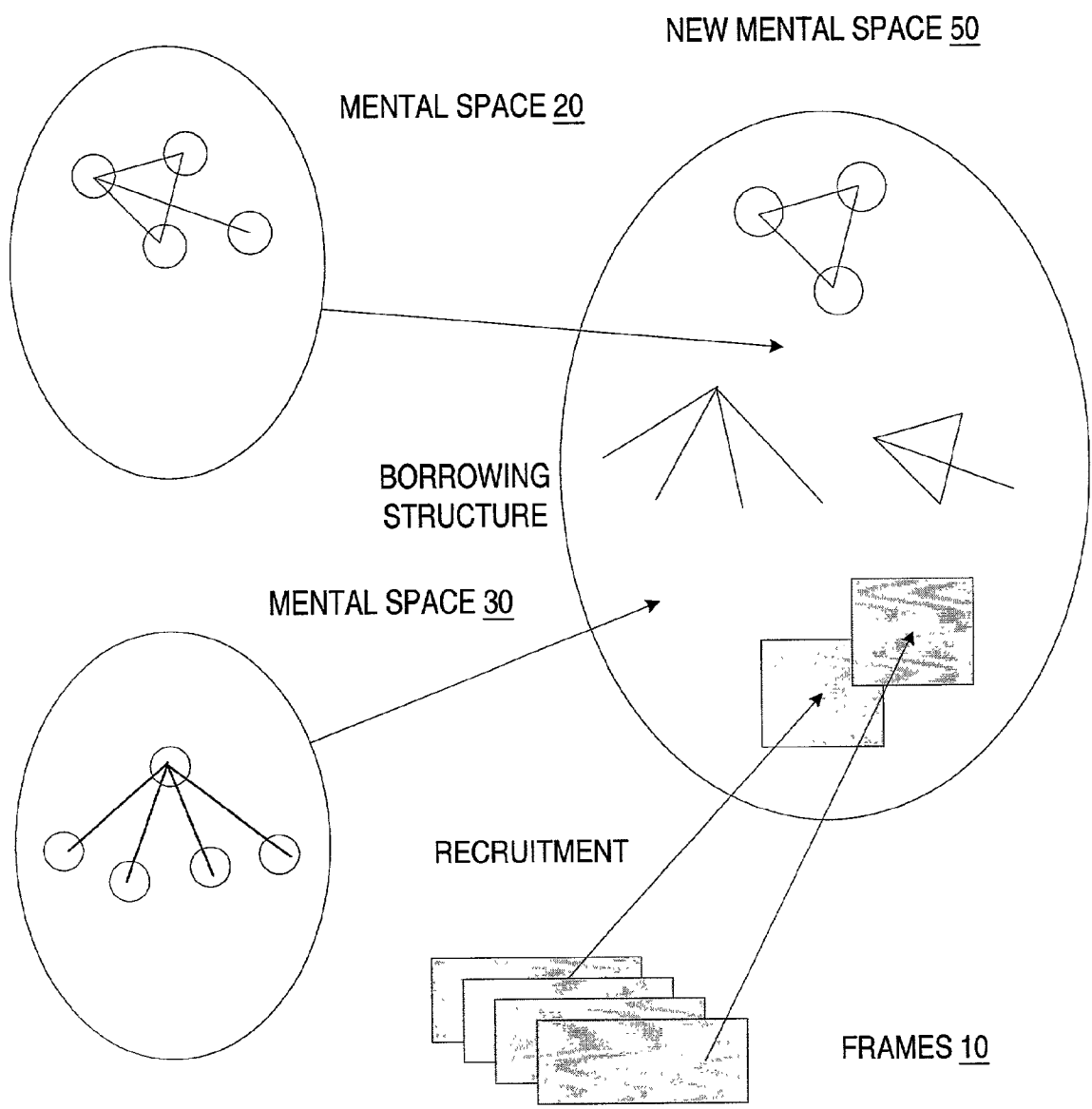
FIGS. 1 and 2 are prior art embodiments for creating mental spaces.

A method and apparatus for processing descriptions of audiovisual content are described. In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMS, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The present invention relates to various aspects of creating descriptions of audiovisual content. As described above, current descriptive tools lack the ability to produce descriptions that can describe audiovisual content in a complete and accurate manner. This limitation is caused by the entity-specific nature of current semantic descriptions. That is, each semantic description describes a specific entity independently from contextual and background information that relates to this specific entity. However, this approach contradicts the rules governing perception and interpretation of speech which is the prototype for semantic descriptions. Some of these rules are based on the use of mental space theory that is well known in the art.

Mental spaces provide context for communication by importing a lot of information not included in the speech, thereby providing a mechanism for interpreting semantic content in language. This information is imported using maps. These maps function by using (i.e., "recruiting") frames which represent predefined constructs for interpretation, projecting structure from one mental space to another, and integrating or abstracting imported material from more than one other mental space. Accordingly, each mental space may represent an extended description containing entities, relationships, and frames. Several mental spaces may be active at once, in order to properly define all the entities in the description. These mental spaces enter into relationships with each other. Because the mental spaces borrow structure and entities from each other, mappings are necessary between these mental spaces. The whole composite forms a backdrop to the expressed description and completes the process of attaching semantic meaning to the entities involved.

Figure 2:
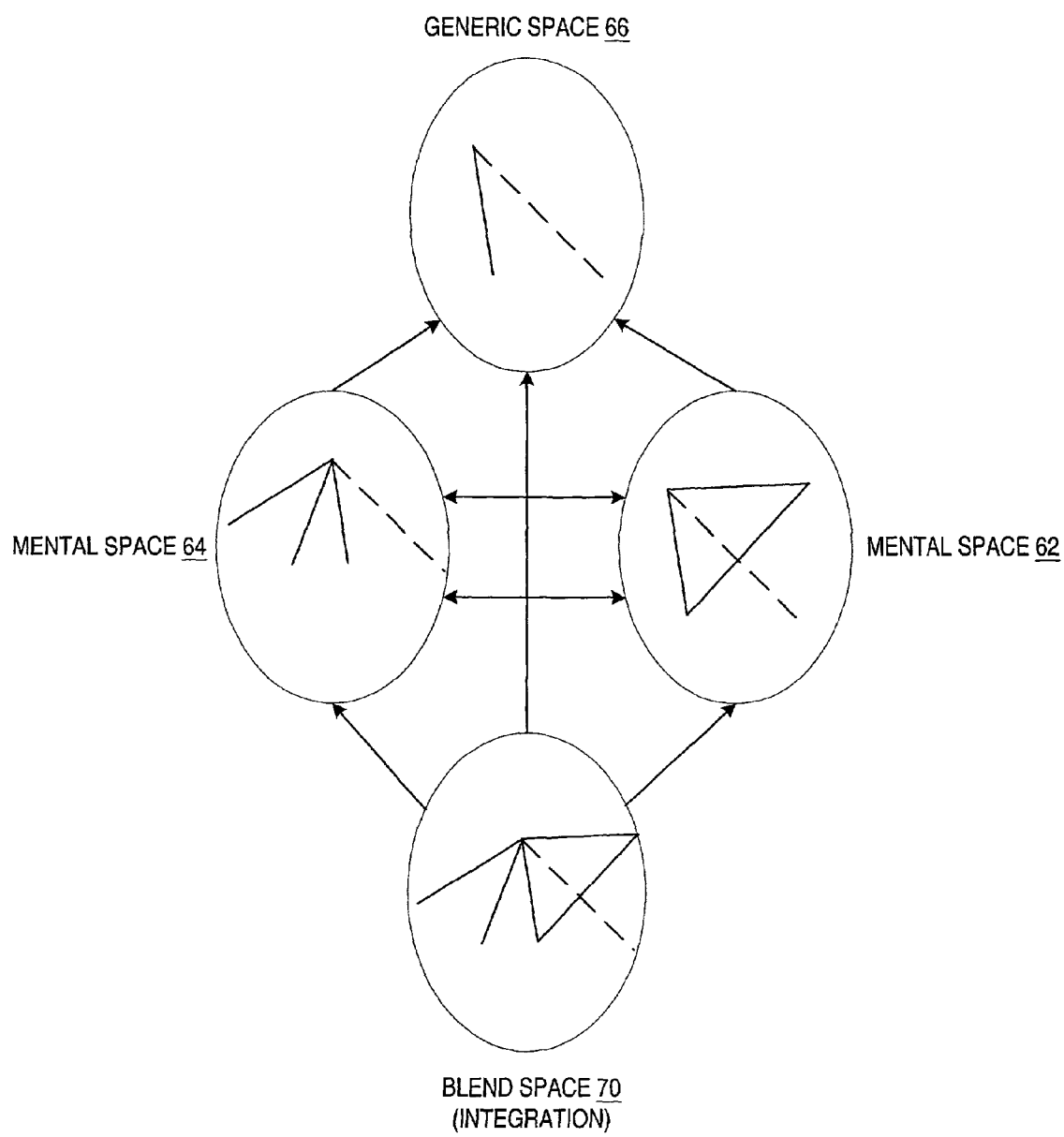

FIGS. 1 and 2 are prior art embodiments for creating mental spaces. Referring to FIG. 1, a new mental space 50 is created by recruiting some of frames 10 and borrowing structures from existing mental spaces 20 and 30. Referring to FIG. 2, a new mental space 70 is created by blending or integrating two existing mental spaces 62 and 64. A generic space 66 may then be created by abstracting from all three mental spaces: new mental space 70 and existing mental spaces 64 and 62. A generic space 66 includes structures that are common to the mental spaces 62, 64 and 70.

The present invention uses the mental space model to enable creation of semantic descriptions that are capable of completely describing any semantic situation. In one embodiment, the tool for creating complete semantic descriptions is based on a number of description categories. These categories may include objects, events, states, episodes, frames, descriptive structures, and mental spaces. The term "object" as used herein refers to a description of a real object, or of a composite or abstraction of several real objects. Objects contain states. Each state is a collection of attributes that are attached to objects and relationships. By extension, states may be attribute collections of mental spaces. Objects may have sub-objects and object states may have substates. A change in state is an event. As such, an event may be a change in any of the constituents of a description of an object or relationship (including what represents the mental spaces). Because states may have substates, events may have subevents.

States may also be attached to episodes, and an event may be a change in any of the constituents of a description of an episode. An episode is a semantically significant time span. Episodes may coincide with the behavior of objects, with the occurrence of events, with changes in relationships, or changes in the mental spaces used to provide context to the objects, events, and relationships. If semantically significant time spans are properly contained in an episode, they are subepisodes.

A frame is a presumed or predefined set of rules for interpreting or describing a set of semantic objects. As such, frames may be prototypical descriptions themselves, or they may be sets of rules, definitions, and descriptive structures. Descriptive structures are abstractions of objects, episodes, states, and relationships. A mental space is a collection of objects, relationships, and frames, together with mappings that embed descriptive structures from descriptions or from other mental spaces.

A complete description of semantic content may consists of any combination of descriptions of the above categories. In addition, the complete description should include descriptions of relationships between semantic entities that are included in the complete description of semantic content. A relationship between the entities is either a relation or a mapping. Because relations can be expressed as compositions of mappings, the term "mapping" can also be used to identify a relation. Relationships may be of various types such as, for example, inclusion, containment, similarity, example of, relative position, etc.

The relationships between objects form structure. Further, the mapping of objects, states, and events into an episode is structure. The mappings that make up the underlying mental spaces are structures. States may be represented as maps from the entities described by the states to spaces of attribute values. Even objects can be described as structure: objects are in one-to-one correspondence with the mappings from any point set to the objects themselves, or any mappings from the objects themselves to a one point set). Thus, structure is an inherent part of a semantic description construct.

Structure may take various forms including morphisms, graphs, categories, functors, natural transformations, etc. Morphisms are arrows between objects in a category. A category consists of two sets, a set of objects, and a set of morphisms, which obey the following two rules:
1) For each object, there must be a morphism to itself called the "identity" morphism;
2) If f is a morphism from A to B, and g is a morphism from B to C, then there must be a morphism (usually written as (g o f)) from A to C that is equivalent to first determining f and then determining g.

It is possible to define mappings between categories. Mappings between categories must take objects to objects and morphisms to morphisms. Mappings between categories also need to take the source and target of any morphism to the source and target of its image under the mapping (this is a rule that defines morphisms for the category of graphs). Mappings between categories need to satisfy two constraints, called categorical constraints:
1) They must take the identity maps to identity maps; and
2) They must preserve compositions, i.e., if F takes A to X, B to Y, C to Z, and takes f to h and g to p, then F must take (g o f) to (p o h). Any map that obeys the above constraints is called "categorical".

A categorical map between two categories is called a functor. A functor maps between categories, e.g., F maps category C to category D. It is possible to see this with C and D being like objects, and F being like an arrow (morphism). If G maps category H to category J, then we can make a new map that takes C to H, D to J and F to H. If this new map obeys categorical constraints, then it is called a Natural Transformation.

Figure 3:
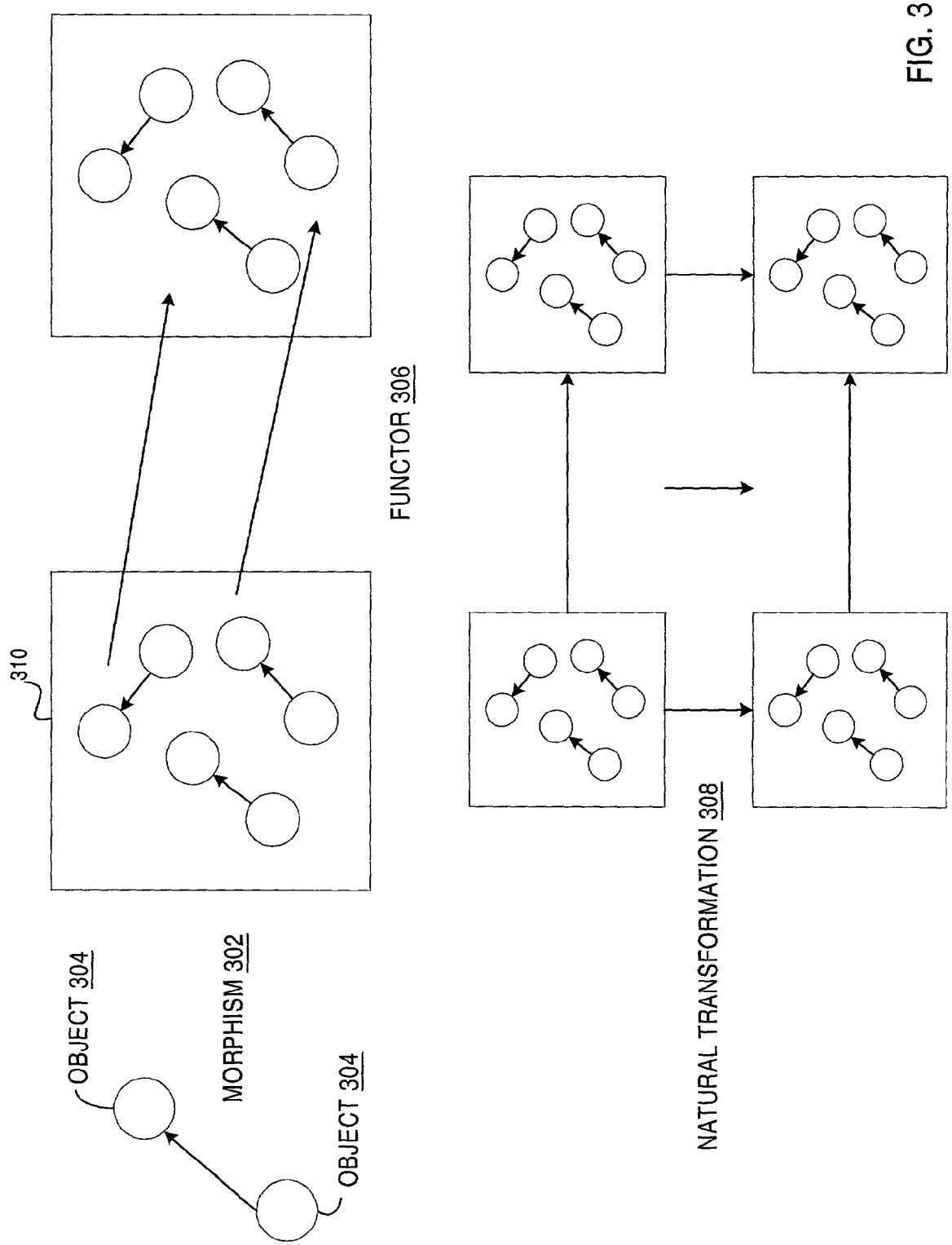
FIG. 3 illustrates a hierarchy of various structural forms of semantic descriptions of audiovisual content.

FIG. 3 illustrates a hierarchy of various structural forms of semantic descriptions of audiovisual content. Morphism 302 is a map between two objects 304. Each category 310 consists of a set of objects (including, for example, objects 304) and a set of morphisms (including, for example, morphism 302). Functor 306 is a map between categories 310. Natural transformation 308 is a map between functors. There is no need to make a map between natural transformations because the hierarchy can be continued using "functor categories").

Thus, a complete description of audiovisual content may include descriptions of various semantic entities (e.g., objects, events, states, episodes, frames, descriptive structures, and mental spaces), together with descriptions expressing the structure of the complete description. Although this approach provides semantic descriptions that are capable of describing any semantic description in a complete and accurate manner, it may add a significant degree of complexity to the resulting semantic descriptions. One embodiment of the present invention addresses this complexity by distributing existing descriptions of audiovisual content. In this embodiment, existing descriptions can be archived and then reused to create new descriptions, as will be described in greater detail below.

Figure 4:
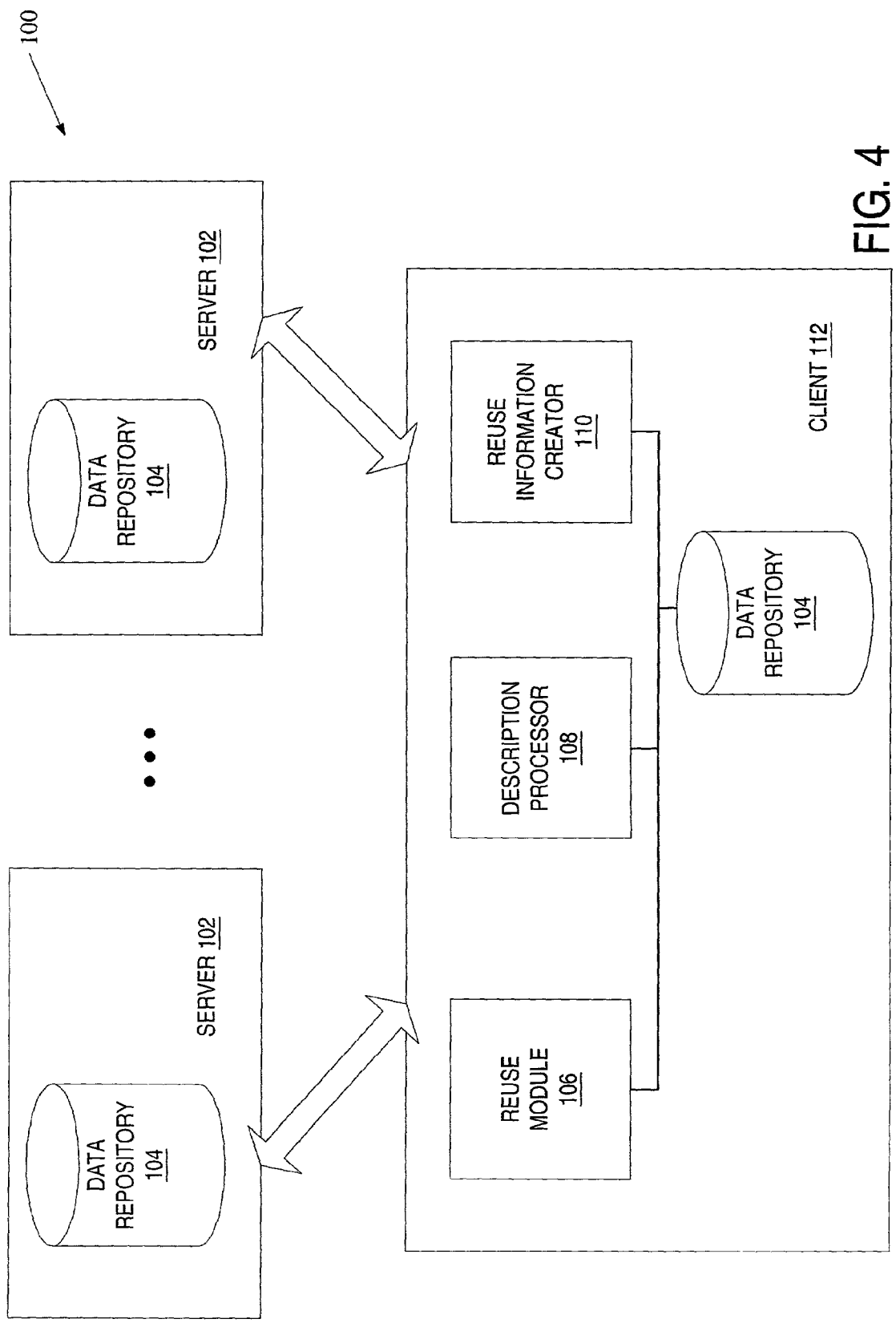
FIG. 4 is a block diagram of one embodiment of a system for processing descriptions of audiovisual content.

FIG. 4 is a block diagram of one embodiment of a system 100 for processing descriptions of audiovisual content. System 100 consists of one or more server computers 112 coupled to one or more client computers such as client 112. Client 112 may communicate with server 102 via any wire or wireless communication link including, for example, a public network such as Internet, a local network such as Ethernet, Intranet and local area network (LAN), or a combination of networks. Each of client 112 and server 102 may be any type of computing device such as, for example, a desktop computer, a workstation, a laptop, a mainframe, etc.

In one embodiment, server 102 contains data repository 104 which stores various descriptions of audiovisual content. In one embodiment, data repository 104 contains only semantic descriptions of audiovisual content, i.e., descriptions that describe the actual meaning of the audiovisual content. Alternatively, data repository 104 stores descriptions of other types (e.g., segment descriptions), in addition to semantic descriptions. Descriptions are stored independently from the audiovisual content that they describe. In one embodiment, each description is stored with associated reuse information which indicates how this description can be reused to create other descriptions of audiovisual content. The functionality of the reuse information will be described in greater detail below.

Client 112 includes a tool for creating new descriptions by reusing existing descriptions of audiovisual content. In one embodiment, this tool includes a reuse module 106, a description processor 108, and a reuse information creator 110. In one embodiment, client 112 also includes a data repository 114 to store descriptions of audiovisual content locally.

Reuse module 106 is responsible for finding existing descriptive data that can be reused to create a new description of audiovisual content. In one embodiment, this descriptive data resides in data repository 104 of one or more servers 102. Alternatively, some or all of this descriptive data may reside locally in data repository 114. The existing descriptive data may include portions or entire descriptions of audiovisual data. As described above, each description is stored with associated reuse information. The reuse module 106 is responsible for analyzing this reuse information to determine what type of reuse is allowable for this particular description.

Description processor 108 is responsible for creating new descriptions of audiovisual content using the existing descriptive data and the associated reuse information. Reuse information creator 119 is responsible for defining reuse information for the newly created description of audiovisual content. In one embodiment, the new description is stored locally in data repository 114. Alternatively, the new description is transferred to server 102 for storing in data repository 104. In either embodiment, the new description is stored with associated reuse information to enable subsequent reuse of this description.

Figure 5:
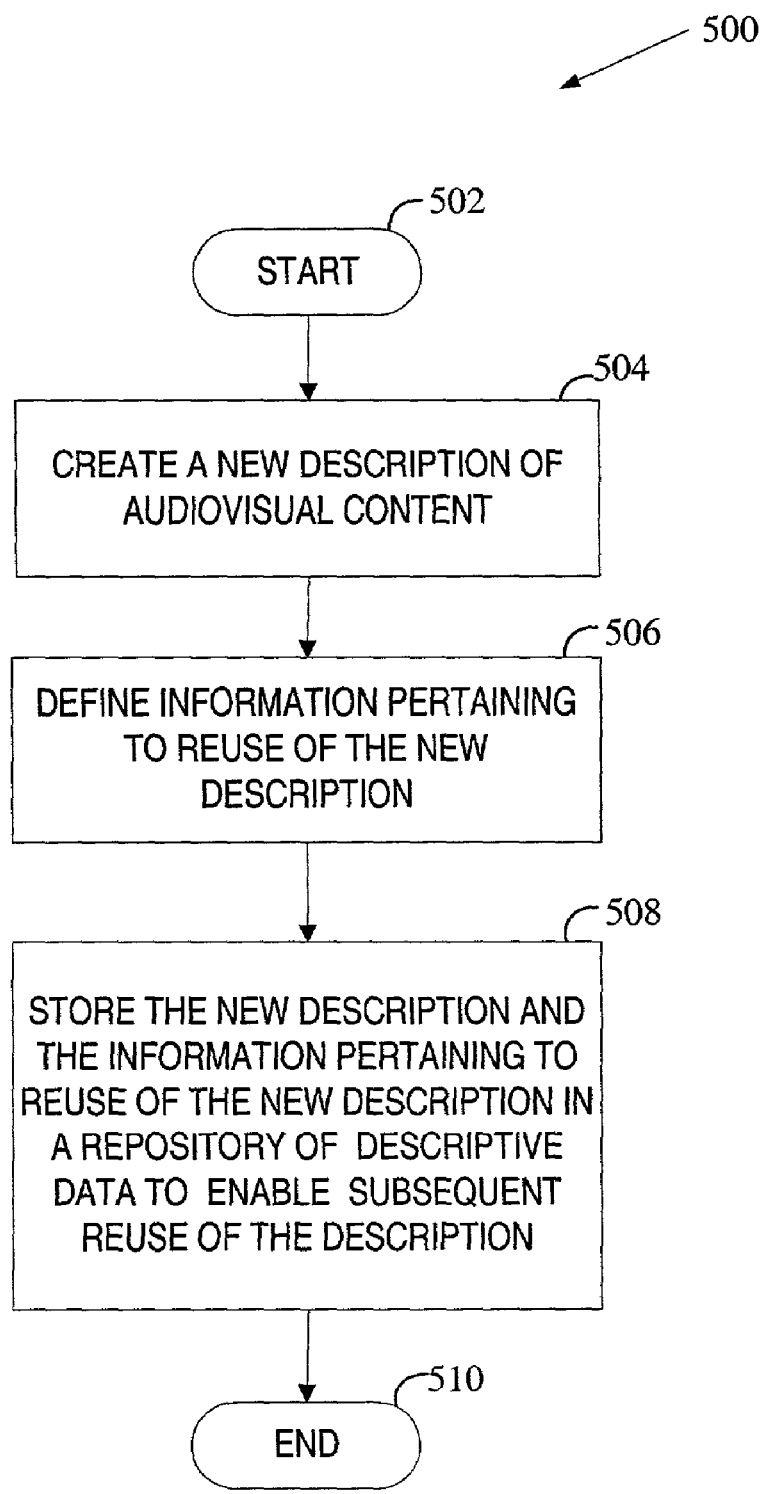
FIG. 5 is a flow diagram of one embodiment for providing distributed descriptions of audiovisual content.

FIG. 5 is a flow diagram of one embodiment for providing distributed descriptions of audiovisual content. At processing block 504, a new description of audiovisual content is created. In one embodiment, the new description is created by reusing one or more existing descriptions as will be described in greater detail below in conjunction with FIG. 6. Alternatively, a new description is created by abstracting from a plurality of existing descriptions, i.e., by extracting common attributes from the existing descriptions. In one embodiment, the new description is a descriptor. Alternatively, the new description is a description scheme (DS). As described above, descriptors represent features of audiovisual content and define the syntax and the semantics of each feature representation. DSes specify the structure and semantics of the relationships between their components. These components may be both descriptors and description schemes. In one embodiment, the new description is a semantic description. A semantic description may describe such semantic entities as events, objects, states, relationships, episodes, descriptive structures, mental spaces, or any combination of the above semantic entities.

At processing block 506, information pertaining to subsequent reuse of the created description is defined. This information indicates what type of reuse is allowable for this description. For example, the reuse information may indicate whether this description can be embedded in another description without changing the intended meaning of this description or whether this description can be subdivided into components which maintain their meaning when extracted for reuse. The reuse information may also indicate whether the description can be transformed to enable the reuse of this description. For example, the reuse information may specify whether a description of an eye can be mirrored to produce a description of the other eye. Further, the reuse information may indicate whether the description can maintain its transitive capability when this description is reused. For example, the reuse information may specify whether the description will function as a subset if this description is embedded into a larger description.

At processing block 508, the description and associated reuse information are stored in a repository of descriptive data to enable subsequent reuse of this description. The reuse information may be stored as a set of flags associated with various reuse types, as a number specifying a combination of reuse types allowable for the description, or in any other form. In one embodiment, the description is stored on a network server and may be accessed by a plurality of client computers over a network (e.g., Internet or a local network). Alternatively, the description may be stored locally on a client computer and may be accessed by the users of the client computer. In either embodiment, the description can subsequently be reused to create new descriptions based on the reuse information associated with this description.

Figure 6:
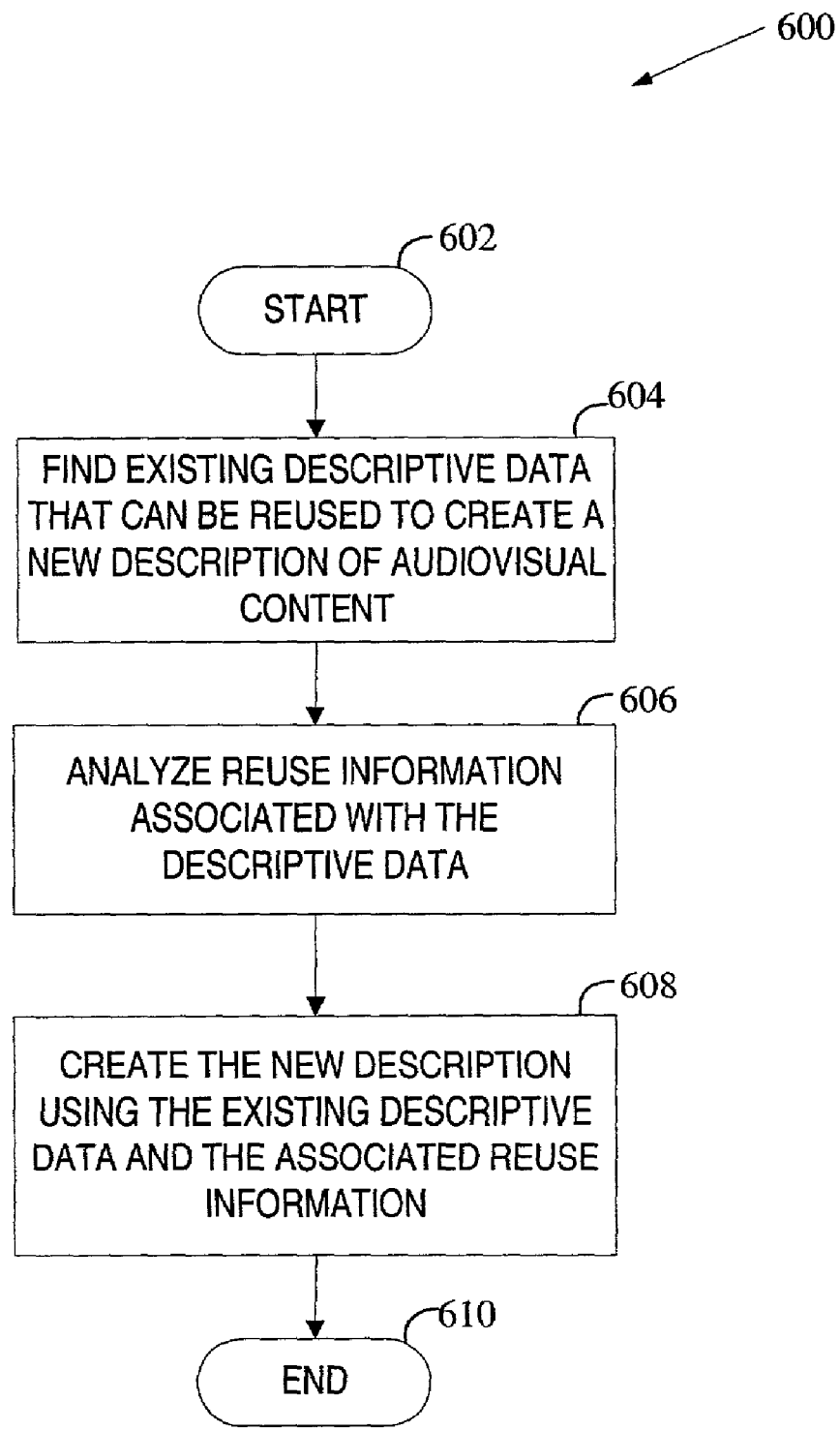
FIG. 6 is a flow diagram of one embodiment for reusing descriptions of audiovisual content.

FIG. 6 is a flow diagram of one embodiment for reusing descriptions of audiovisual content. At processing block 604, existing descriptive data that should be included in a new description is found. In one embodiment, the existing descriptive data includes one or more descriptions of audiovisual content (or portions of descriptions) that are selected from a plurality of descriptions stored on a network server(s). For example, a description provider may create a plurality of descriptions that may potentially have a widespread use and publish them on a web site for future reuse. In another example, descriptions published on a web site may be abstractions (or templates) created by extracting common features from various existing descriptions. In this example, such description may be stored with an indicator specifying that this description is an abstraction. In another embodiment, the existing descriptive data or its portion is selected from a local repository of descriptive data.

At processing block 606, reuse information associated with the selected descriptive data is analyzed to determine how the selected descriptive data can be reused. As described above, the reuse information may indicated whether the selective descriptive data can be subsumed, subdivided or transformed, or whether the selected descriptive data is transitive.

At processing block 608, a new description is created using the selected descriptive data and associated reuse information. In one embodiment, the new description includes a reference to the selected descriptive data, rather than the date itself, thereby avoiding the creation of a large and complex description. Since the descriptive data may consist of multiple descriptions (or their portions), the description may include references to multiple descriptions. For instance, a new DS may include references to such DSes as, for example, object DSes, event DSes, state DSes, relationship DSes, episode DSes, descriptive structure DSes, and mental space DSes. Depending on the form of reuse, a mapping of each existing description into a new description is needed. In one embodiment, such mapping is defined each time it is needed to create a new description. Alternatively, an archived version of the mapping is referred to in a new description.

In one embodiment, the new description is created by converting the existing descriptive data into a part of a description and mapping this partial description into a new description. For instance, under current MPEG-7 standards, a complete semantic description may include multiple object DSes, event DSes, and concept DSes. A concept DS, which is intended to allow encapsulation of a complex abstraction, may again contain object DSes, event DSes, and concept DSes. Since a concept DS can be included in descriptions of objects and events, creating a new description of an object or event requires converting an existing concept DS into a part of the new description and mapping this concept DS into the new description.

In another embodiment, a new description is created by accessing a portion of an existing description and mapping this partial description into the new description, thereby enabling the reuse of a portion of an existing description, rather than the entire existing description. For instance, an object DS contained within an existing concept DS may be accessed and mapped into a new description of audiovisual material. In one embodiment, a partial description is extracted from an existing description, converted into a standalone description, and then embedded into a new description.

In yet another embodiment, a new description is created by selecting various existing descriptions (or their portions), and combining them by using combination rules from a dictionary of rules for combining descriptions. The existing descriptions are mapped into the dictionary entries, and the rules are executed to create a new description. Then, the corresponding objects are identified with parts of the new description. The rules and descriptions can be located on the local machine, in a single data repository, or in several data repositories, and may be executed by the description processor. The data repositories may have rules for forming descriptions as well as existing descriptions to use, and these are organized in dictionaries.

In one embodiment, existing descriptions or portions of existing descriptions are mapped into new descriptions using any known in the art mechanisms that are capable of performing graph operations between various descriptions of audiovisual data. Alternatively, object oriented inheritance mechanisms may be used for this purpose. For example, private inheritance allows the inheritance of attributes and methods without the acquisition of a data type relationship. Accordingly, private inheritance can be used, for example, to map a portion of an existing description into a new description. Public inheritance provides a mechanism for generating categorical structure. Thus, public inheritance can be used, for example, to map an existing description, which is converted into a part of a new description, to the new description. In addition, both private inheritance and public inheritance can be used to map existing descriptions to new descriptions. For example, both types of inheritance may be used to map existing descriptions into abstractions and then to further map the abstractions into a new description which combines these abstractions.

In one embodiment, multiple reuse of descriptions enables de facto standardization (as opposed to pure standardization) of the descriptions by category. That is, as opposed to the pure standardization imposed as the outset in MPEG-7 that cannot possibly know the categories arising in application after the standard is adopted, the standard may be created naturally by identifying, through multiple reuse, those description categories that have the most application and use.

According to one embodiment of the present invention, the creation of descriptions of audiovisual content is performed at the same time as the creation of the audiovisual content by dynamically reusing existing descriptions. For example, when describing a news program dedicated to a national disaster concurrently with the continuing coverage of the national disaster, the descriptions of the news program are dynamically updated to create new descriptions of the evolving content.

Figure 7:
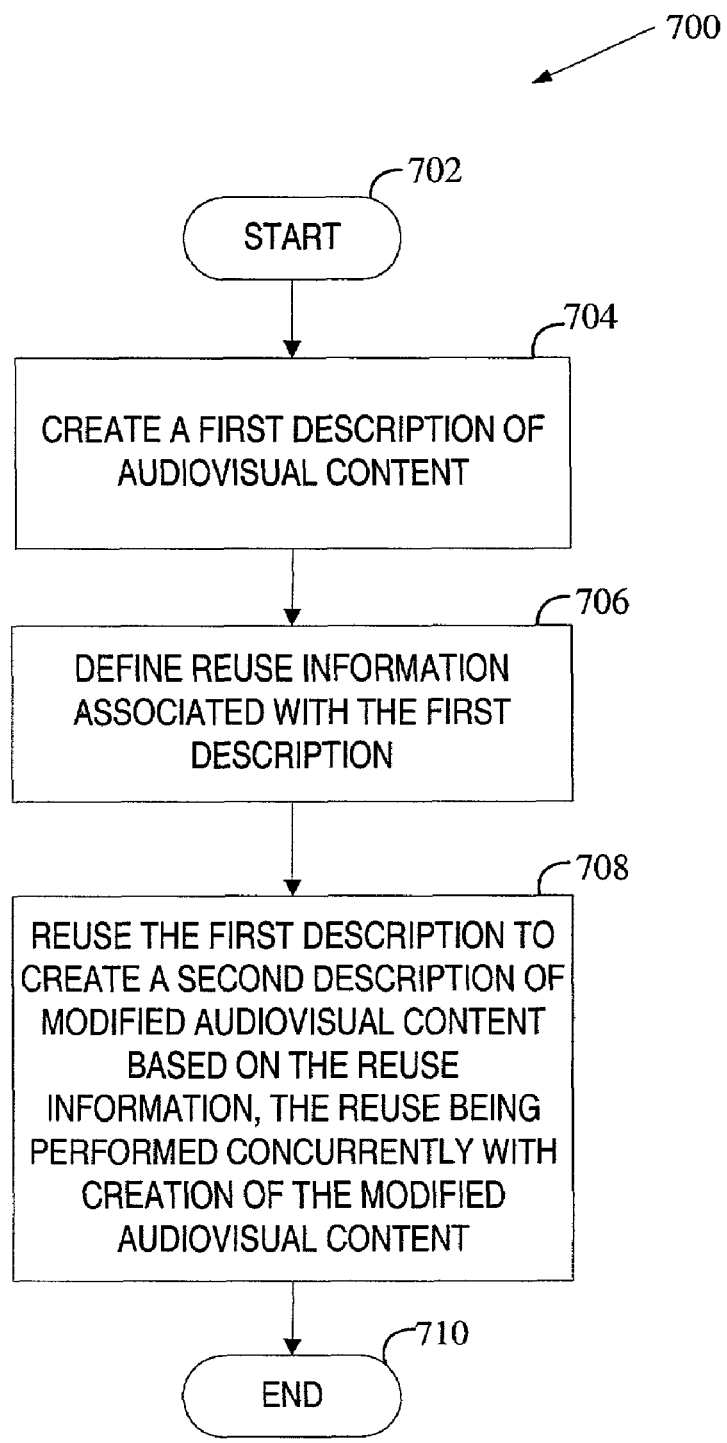
FIG. 7 is a flow diagram of one embodiment for dynamic reuse of descriptions of audiovisual content.

FIG. 7 is a flow diagram of one embodiment for dynamic reuse of descriptions of audiovisual content. At processing block 704, a first description of audiovisual content is created. At processing block 706, reuse information associated with the first description is defined as described in more detail above. In one embodiment, the first description and the associated reuse information is then stored in a local data repository.

At processing block 708, the first description is reused to create a second description of modified audiovisual content based on the reuse information. The second description is created concurrently with the creation of the modified audiovisual content. In one embodiment, the second description is created by updating parameter values of the first description. In another embodiment, the second description is created by combining the first description with other new or existing descriptive data. In yet another embodiment, the second description is created by reusing some portions of the first description and discarding the other portions of the first description that are no longer appropriate. For example, during the description of an online episode, the relationships between its objects may vary, as well as the structures needed to describe them. Then, the current description may need to be modified by updating its parameter values and by bringing in new descriptions or partial descriptions to describe emergent behavior, discarding portions of the current description that are no longer needed.

In one embodiment, dynamic reuse is performed using object-oriented modeling such as system object model (SOM) of IBM™. SOM, which is an architecture that allows binary objects to be shared by different applications, enables dynamic changes of descriptions, relationships, and attributes of a structure while it evolves.

Figure 8:
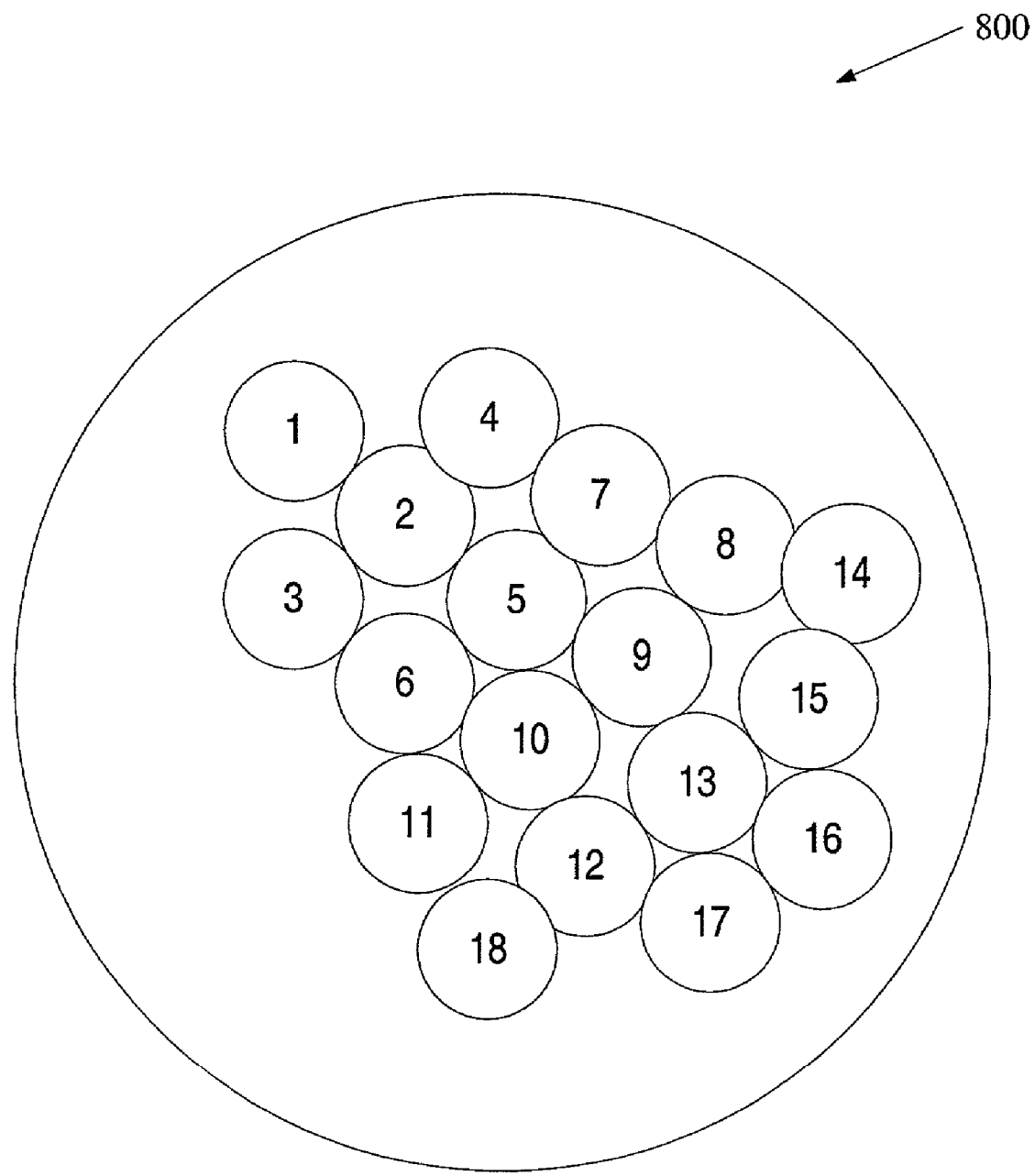
FIG. 8 illustrates an exemplary semantic mosaic.

One embodiment of the present invention utilizes a semantic mosaic to create new descriptions of audiovisual content. A semantic mosaic is a collection of various descriptions that are blended together using interrelations between neighboring descriptions. FIG. 8 illustrates an exemplary semantic mosaic 800. Mosaic 800 is composed of multiple semantic descriptions of audiovisual content, including descriptions 1-18. When mosaic 800 is created, descriptions that relate to each other are blended. For example, descriptions 1 and 2 have a point at which they carry the same information. This point is used to blend descriptions 1 and 2 together. Description 2 may also have another common point with description 3. This other point may be used to blend description 3 with description 2. A third common point may be used to blend descriptions 2 and 5 together, etc. As a result, description 2 is blended with descriptions 1, 3, 4 and 5 that all relate to description 2 but may not have any interrelations between each other. Thus, semantic mosaic 800 presents a description which does not describe any semantic material in particular but includes local pieces that represent descriptions of various semantic content. Each local piece may combine several descriptions to describe a certain semantic entity. Depending on the context, the number of the descriptions included in a particular local piece may vary. For instance, in one context, the combination of descriptions 5, 10 and 11 may provide a complete description of audiovisual content. In another context, the combination of descriptions 5, 9, 10, 12 and 13 may be needed to provide a complete description of audiovisual content. When a new description is created, an appropriate local piece may be reused to create the new description. The descriptions contained in each local piece have previously defined relationships. Thus, new descriptions may be created by merely extracting appropriate local pieces from the semantic mosaic. Alternatively, the local pieces may be combined with other descriptive data to form new descriptions.

Figure 9:
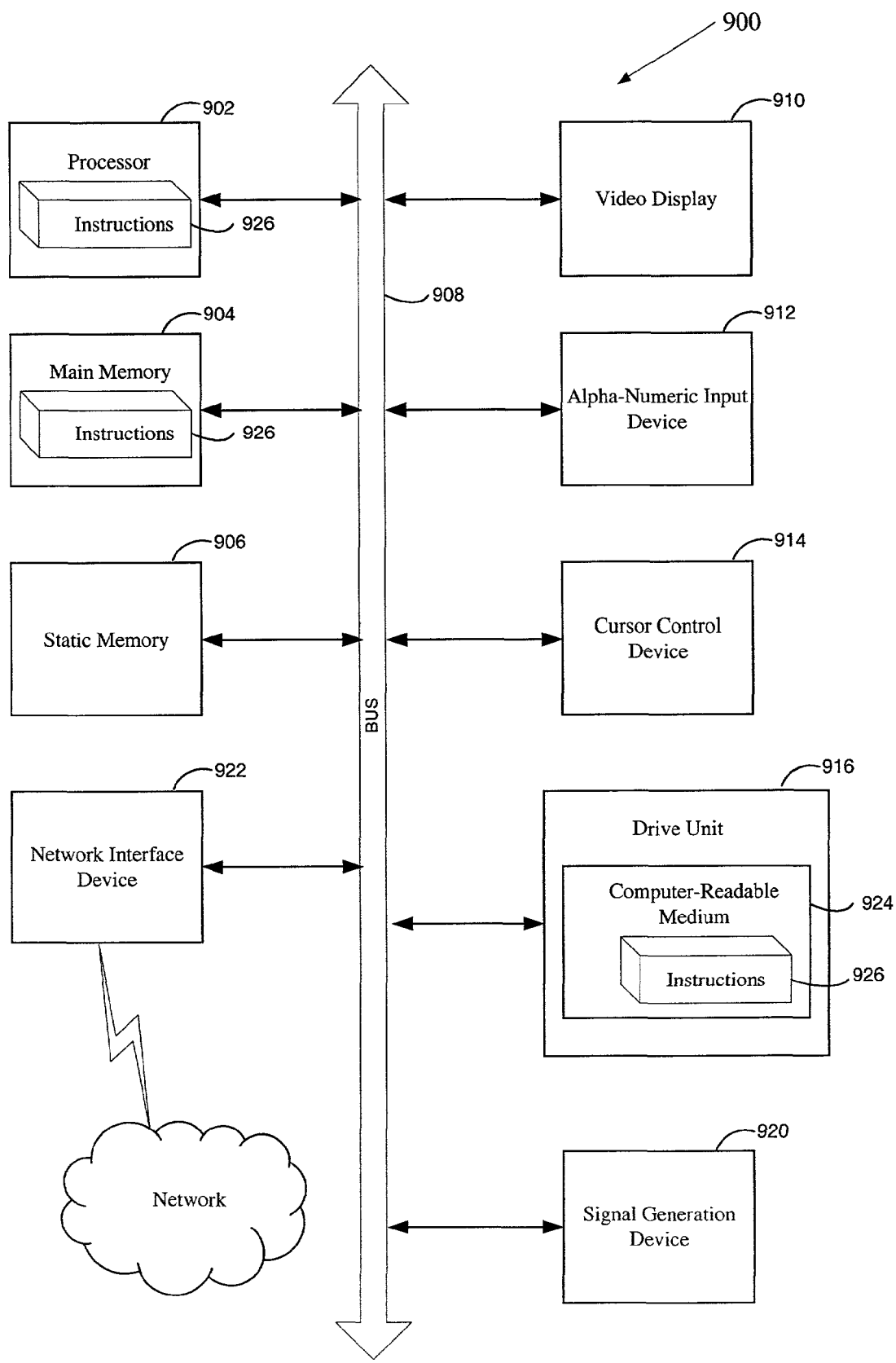
FIG. 9 is a block diagram of one embodiment of a computer system.

FIG. 9 is a block diagram of one embodiment of a computer system 900 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 900 includes a processor 902, a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alpha-numeric input device 912 (e.g., a keyboard), a cursor control device 914 (e.g., a mouse), a disk drive unit 916, a signal generation device 920 (e.g., a speaker) and a network interface device 922.

The disk drive unit 916 includes a computer-readable medium 924 on which is stored a set of instructions (i.e., software) 926 embodying any one, or all, of the methodologies described above. The software 926 is also shown to reside, completely or at least partially, within the main memory 904 and/or within the processor 902. The software 926 may further be transmitted or received via the network interface device 922. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Thus, a method and apparatus for processing descriptions of audiovisual content have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of execution by a processor for processing descriptions of audiovisual content, the method comprising:
    creating a first description that describes a concept depicted in an existing audiovisual content;
    defining, by the processor, reuse information pertaining to reuse of the first description, the reuse information indicating a type of reuse that is allowed; and
    storing the first description and the reuse information in a repository of descriptive data to enable subsequent reuse of the first description, in accordance with the reuse information, to create a second description that describes a similar concept depicted in a new audiovisual content that is different than the existing audiovisual content, wherein the second description includes a reference to the first description that is to be reused.

2. The method of claim 1 wherein the first description is a semantic description.

3. The method of claim 1 wherein the first description is a description scheme.

4. The method of claim 1 wherein the reuse information indicates whether the first description can be embedded into the second description without changing an intended meaning of the first description.

5. The method of claim 1 wherein the reuse information indicates whether the first description can be divided into a plurality of partial descriptions, each of the plurality of partial descriptions being suitable for subsequent reuse.

6. The method of claim 1 wherein the reuse information indicates whether the first description can be transformed when reused to create the second description.

7. The method of claim 1 wherein the reuse information indicates whether the first description can maintain transitive capability when the first description is reused to create the second description.

8. The method of claim 1 further comprising:
    reusing a plurality of descriptions stored in one or more repositories of descriptive data a number of times to provide de facto standardization of the plurality of descriptions by category.

9. A method of execution by a processor for reusing descriptions of audiovisual content, the method comprising:
    finding existing descriptive data that describes a concept depicted in an existing audiovisual data that is similar to a concept depicted in a new audiovisual content that is different than the existing audiovisual content;
    analyzing reuse information associated with the descriptive data, the reuse information indicating a type of reuse that is allowed; and
    creating, by the processor in accordance with the associated reuse information, a new description for the new audiovisual content using the existing descriptive data and the associated reuse information, wherein the new description includes a reference to the existing descriptive data that is to be reused.

10. The method of claim 9 wherein the new description is a semantic description.

11. The method of claim 9 wherein the new description is a description scheme.

12. The method of claim 9 wherein the descriptive data is at least a portion of one or more existing descriptions of audiovisual content.

13. The method of claim 9 further comprising:
    retrieving the descriptive data from one or more repositories of descriptive data.

14. The method of claim 9 wherein creating the new description further comprises:
    converting the existing descriptive data into a partial description; and
    mapping the partial description to the new description.

15. The method of claim 9 wherein creating the new description further comprises:
    accessing a portion of the existing descriptive data in a repository of descriptive data; and
    mapping the portion of the existing descriptive data to the new description.

16. The method of claim 9 wherein creating the new description further comprises:
    performing dictionary mapping of objects in the existing descriptive data to corresponding objects in the new description.

17. The method of claim 9 wherein the new description is created using a mechanism for performing graph operations.

18. The method of claim 9 wherein the new description is created using an object oriented inheritance mechanism.

19. The method of claim 9 wherein creating the new description further comprises:
    extracting the existing descriptive data from a semantic mosaic that integrates a plurality of related descriptions.

20. A method for dynamically reusing descriptions of audiovisual content, the method comprising:
    creating a first description that describes a concept depicted in an existing audiovisual content;
    defining reuse information associated with the first description, the reuse information indicating a type of reuse that is allowed; and
    reusing the first description, by the processor, to create a second description that describes a similar concept depicted in a modified audiovisual content in accordance with the reuse information, the reuse being performed concurrently with creation of the modified audiovisual content, wherein the modified audiovisual content is different than the existing audiovisual content, wherein the second description includes a reference to the first description that is to be reused.

21. A system for processing descriptions of audiovisual content, the system comprising:
    means for creating a first description that describes a concept depicted in existing audiovisual content, the means for creating including a processor;
    means for defining reuse information pertaining to reuse of the first description, the reuse information indicating a type of reuse that is allowed; and means for storing the first description and the reuse information in a repository of descriptive data to enable subsequent reuse of the first description to create, in accordance with the reuse information, a second description that describes a similar concept depicted in a new audiovisual content that is different than the existing audiovisual content, wherein the second description includes a reference to the first description that is to be reused.

22. An apparatus comprising:
a description processor to create a first description that describes a concept depicted in an existing audiovisual content;
a reuse information creator to define reuse information pertaining to reuse of the first description, the reuse information indicating a type of reuse that is allowed; and
a repository of descriptive data to store the first description and the reuse information to enable subsequent reuse of the first description, in accordance with the reuse information, to create a second description that describes a similar concept depicted in a new audiovisual content that is different than the existing audiovisual content, wherein the second description includes a reference to the first description that is to be reused.

23. The apparatus of claim 22 wherein the first description is a semantic description.

24. The apparatus of claim 22 wherein the first description is a description scheme.

25. The apparatus of claim 22 wherein the reuse information indicates whether the first description can be embedded into a second description of audiovisual content without changing an intended meaning of the first description.

26. The apparatus of claim 22 wherein the reuse information indicates whether the first description can be divided into a plurality of partial descriptions, each of the plurality of partial descriptions being suitable for subsequent reuse.

27. The apparatus of claim 22 wherein the reuse information indicates whether the first description can be transformed when reused to create a second description of audiovisual content.

28. The apparatus of claim 22 wherein the reuse information indicates whether the first description can maintain transitive capability if the first description is reused to create a second description of audiovisual content.

29. A system for reusing descriptions of audiovisual content, the system comprising:
means for finding existing descriptive data that describes a concept depicted in an existing audiovisual data that is similar to a concept depicted in a new audiovisual content that is different than the existing audiovisual content;
means for analyzing reuse information associated with the descriptive data, the reuse information indicating a type of reuse that is allowed; and
means for creating, in accordance with the reuse information, a new description for the new audiovisual content using the existing descriptive data and the associated reuse information, the new description including a reference to the existing descriptive data that is to be reused, the means for creating including a processor.

30. An apparatus comprising:
a reuse module to find existing descriptive data that describes a concept depicted in an existing audiovisual data that is similar to a concept depicted in a new audiovisual content that is different than the existing audiovisual content, and to analyze reuse information associated with the descriptive data, the reuse information indicating a type of reuse that is allowed; and
a description processor to create, in accordance with the associated reuse information, a new description for the new audiovisual content using the existing descriptive data and the associated reuse information, the new description including a reference to the existing descriptive data that is to be reused.

31. The apparatus of claim 30 wherein the new description is a semantic description.

32. The apparatus of claim 30 wherein the new description is a description scheme.

33. The apparatus of claim 30 wherein the descriptive data is at least a portion of one or more existing descriptions of audiovisual content.

34. The apparatus of claim 30 wherein the new description is created using a mechanism for performing graph operations.

35. The apparatus of claim 30 wherein the new description is created using an object oriented inheritance mechanism.

36. A system for dynamically reusing descriptions of audiovisual content, the method comprising:
means for creating a first description that describes a concept depicted in an existing audiovisual content, the means for creating including a processor;
means for defining reuse information associated with the first description, the reuse information indicating a type of reuse that is allowed; and
means for reusing the first description, in accordance with the reuse information, to create a second description that describes a similar concept depicted in a modified audiovisual content in accordance with the reuse information, the reuse being performed concurrently with creation of the modified audiovisual content, wherein the modified audiovisual content is different than the existing audiovisual content, wherein the second description includes a reference to the first description that is to be reused.

37. An apparatus comprising:
a description processor to create a first description that describes a concept depicted in an existing audiovisual content; and
a reuse information creator to define reuse information associated with the first description, the reuse information indicating a type of reuse that is allowed, the description processor to reuse the first description, in accordance with the reuse information, to create a second description that describes a similar concept depicted in a modified audiovisual content in accordance with the reuse information, the reuse being performed concurrently with creation of the modified audiovisual content, wherein the modified audiovisual content is different than the existing audiovisual content, wherein the second description includes a reference to the first description that is to be reused.

38. A non-transitory computer readable storage medium encoded with computer program instructions, which when executed on a processor, cause said processor to perform operations comprising:
creating a first description that describes a concept depicted in an existing audiovisual content;
defining reuse information pertaining to reuse of the first description, the reuse information indicating a type of reuse that is allowed; and
storing the first description and the information pertaining to reuse of the first description in a repository of descriptive data to enable subsequent reuse of the first description, in accordance with the reuse information, to create a second description of a similar concept depicted in a new audiovisual content that is different than the existing audiovisual content, wherein the second description includes a reference to the first description that is to be reused.

39. A non-transitory computer readable storage medium encoded with computer program instructions, which when executed on a processor, cause said processor to perform operations comprising:

finding existing descriptive data that describes a concept depicted in an existing audiovisual data that is similar to a concept depicted in a new audiovisual content that is different than the existing audiovisual data;

analyzing reuse information associated with the descriptive data, the reuse information indicating a type of reuse that is allowed; and creating, in accordance with the associated reuse information, a new description for the new audiovisual content using the existing descriptive data and the associated reuse information, the second description including a reference to the first description that is to be reused.

40. A non-transitory computer readable storage medium encoded with computer program instructions, which when executed on a processor, cause said processor to perform operations comprising:

creating a first description that describes a concept depicted in an existing audiovisual content;

defining reuse information associated with the first description, the reuse information indicating a type of reuse that is allowed; and reusing the first description, in accordance with the reuse information, to create a second description that describes a similar concept depicted in a modified audiovisual content in accordance with the reuse information, the reuse being performed concurrently with creation of the modified audiovisual content, wherein the modified audiovisual content is different than the existing audiovisual content, wherein the second description includes a reference to the first description that is to be reused.

* * * * *